Oct. 31, 1967  J. J. BYLO  3,349,742
CARGO SHIP

Filed Oct. 23, 1965  2 Sheets-Sheet 1

John J. Bylo,
INVENTOR.

BY Robert C. Comstock

Attorney

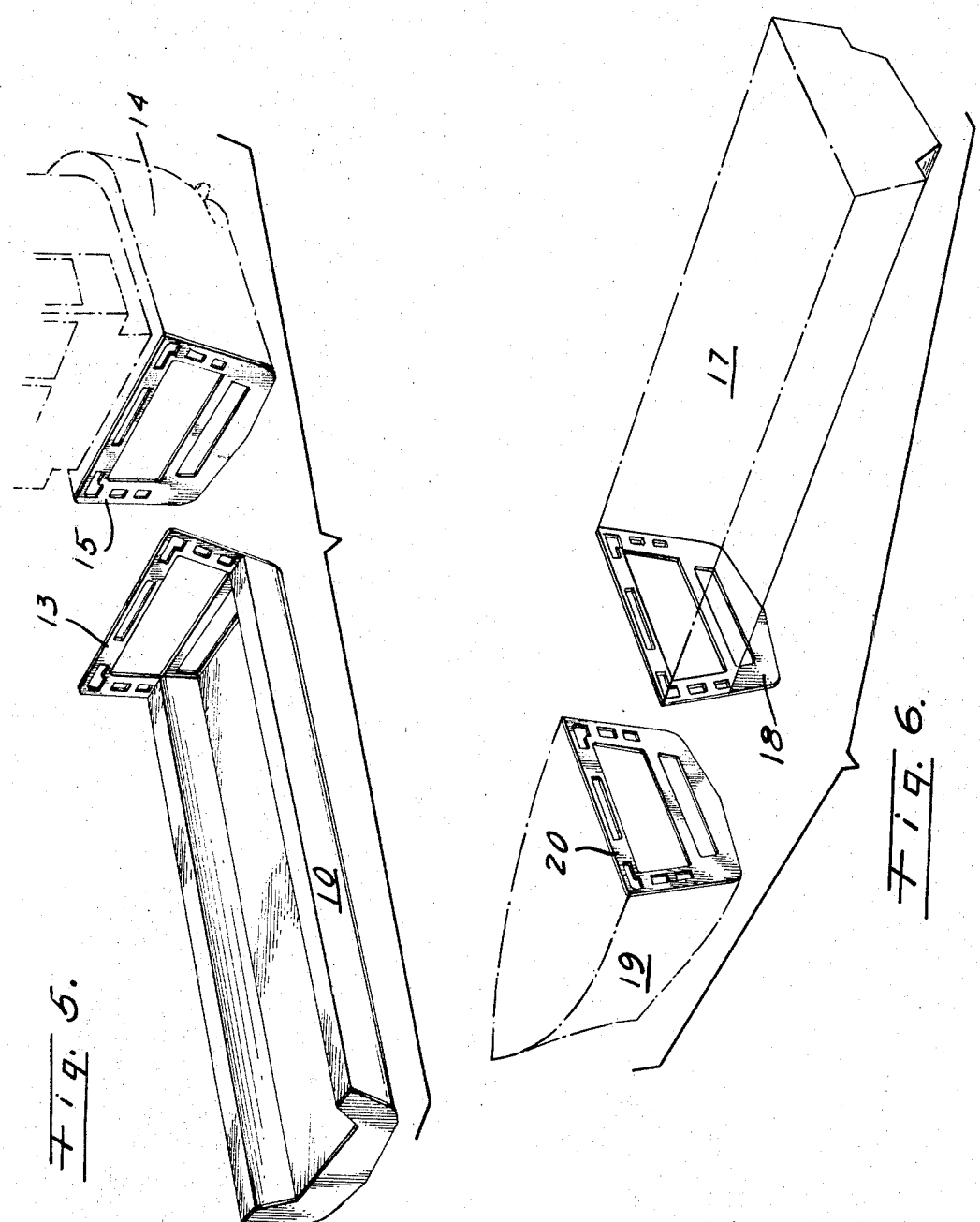

United States Patent Office 3,349,742
Patented Oct. 31, 1967

3,349,742
CARGO SHIP
John J. Bylo, 7272 Willoughby Ave.,
Los Angeles, Calif. 90046
Filed Oct. 23, 1965, Ser. No. 503,113
2 Claims. (Cl. 114—77)

ABSTRACT OF THE DISCLOSURE

A cargo ship formed of two freely interchangeable halves. One half of the ship comprises an elongated cargo base and a stern. Vertically directed plates are secured to the adjacent ends of the cargo base and stern and are attached together permanently to form one half of the ship. The other half of the ship comprises a cargo top and a bow which are similarly connected through a second pair of vertically directed plates. The bow and stern are of variable configuration, while the plates are all of fixed standard configuration, so that a stern of any configuration can be attached to any cargo base, and a bow of any configuration can be attached to any cargo top.

The cargo base has a standard upwardly facing top which receives the standard lower portion of the cargo top, the upper portion of the cargo top being available, so that any two ship halves can be brought together to form a complete ship, regardless of variations in the variable parts of both halves. The cargo base holds a pump for adding or substracting water to raise and lower the cargo base into and out of engagement with the cargo top.

---

This invention relates to a cargo ship and to a method of using the same. The present invention is an improvement upon the structures and methods disclosed in my prior patents Nos. 2,371,149 and 3,139,197.

The primary object of the present invention is to provide a cargo ship and cargo handling method similar to those disclosed in my prior patents, but in which the design of the bow and stern of the ship can be varied without affecting the cargo handling operation.

In essence, my invention contemplates a cargo ship in which a pair of standard cargo carrying members are provided. These members comprise a standard cargo bottom and a standard cargo top. To the standard cargo bottom, a ship builder may attach any desired shape or type of stern and operating engine. To the standard cargo top, a ship builder may attach any desired shape or type of bow.

In use, since the top and bottom are standard, any type of stern may be used with any type of bow. Each ship is formed in two halves, each of which is interchangeable with the complementary half of any and all other ships.

My invention thus provides complete interchangeability while at the same time allowing the ship owner complete freedom of design as to speed, motive power, shape and type of stern and bow, etc. without such variations affecting the interchangeability of the cargo carrying members.

My invention also comprises such other objects, advantages and capabilites as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

FIG. 5 is an exploded perspective view of the aft half of the ship, showing how the stern is formed separately and then attached to the cargo base;

FIG. 6 is an exploded perspective view of the forward half of the ship, showing how the bow is formed separately and then attached to the cargo top.

Figure 1:
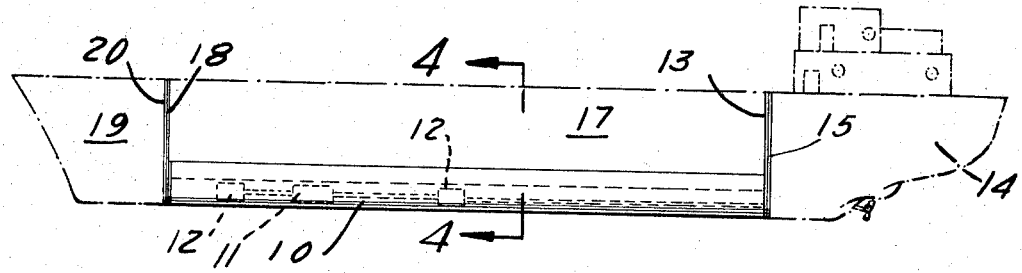
FIG. 1 is a side elevational view of my cargo ship in use.
Figure 2:
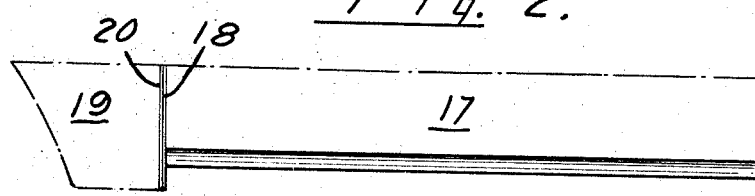
FIG. 2 is a side elevational view of the forward half of the ship, comprising the bow and cargo top.
Figure 3:
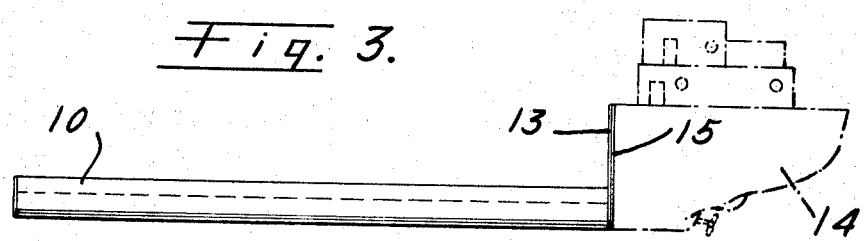
FIG. 3 is a side elevational view of the aft half of the ship, comprising the cargo base and stern.
Figure 4:
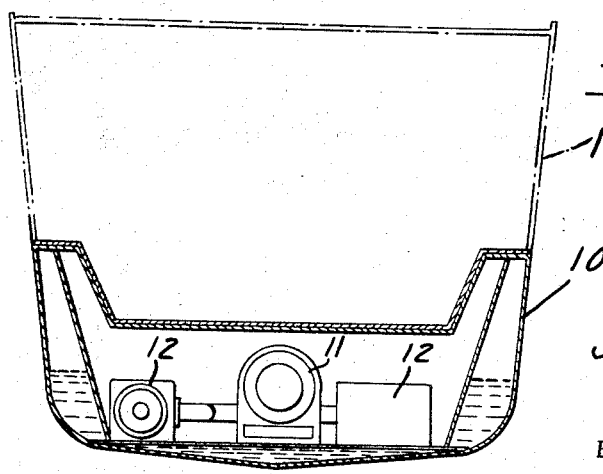
FIG. 4 is a sectional view of the assembled ship, taken on line 4—4 of FIG. 1.

A preferred embodiment which has been selected to illustrate my invention comprises an elongated cargo base 10, which is substantially U-shaped in cross section, with an upwardly facing open top. The cargo base 10 has a hollow interior which is adapted to hold a quantity of water, which may fill the bottom and which may extend upwardly along the sides.

Mounted within the hollow interior of the cargo base 10 is a motor 11, which is connected to a pair of pumps 12. The pumps 12 are connected to suitable inlets and outlets and are so constructed and arranged as to remove water from or add water to the interior of the cargo base 10.

By controlling the amount of water within the cargo base 10, it is possible to control the height of the cargo base 10 relative to the outside level of the water in which the ship is floating. The cargo base 10 can thus be moved vertically for the purpose of connecting with or separating from a cargo top, in the manner taught by my prior patents.

Attached to the stern end of the cargo base 10 is a substantially square plate 13. The plate 13 is standard and is preferably identical in all ships constructed in accordance with my invention. The cargo base 10 is also preferably standard, particularly insofar as the contour of its upwardly facing open top is concerned, so that it will receive and fit any cargo top.

A stern 14, which includes suitable motive power for propelling the ship, is attached at its forward end to a plate 15. The plate 15 is also standard and is preferably identical in all ships constructed in accordance with my invention. The plate 15 is preferably furnished to the ship builder, who can attach it to a stern 14 of any shape or type and using any motive power desired by the builder.

The plate 15 is formed complementarily to the plate 13 and is attached thereto, to join the stern 14 and cargo base 10 together to form one half of the ship. The stern 14 and cargo base 10 are never separated during use of the ship.

The other half of the ship comprises a cargo top 17, the lower part of which is formed complementarily to the upwardly facing open top of the cargo base 10, so that the bottom of the cargo top 17 nests within the cargo base 10. The shape and all of the other characteristics of the upper portion of the cargo top 17 may be varied by the builder of the ship, provided only that the bottom contour must be suitable to fit within the standard cargo base 10.

Attached to the forward end of the cargo top 17 is a plate 18, which is also standard and which is preferably furnished to the ship builder. A bow 19 of any desired configuration is constructed by the ship builder and attached to a plate 20, which is also standard and which is preferably furnished to the ship builder. The plate 20 is formed complementarily to the plate 18 and is attached to it to join the bow 19 to the cargo top 17 and form the other half of the ship.

It will thus be noted that the ship builder is provided with an almost unlimited range of variations, while at the same time the two halves of any ship are always formed so that they are freely interchangeable with the two halves of all other ships.

Each ship comprises two freely interchangeable halves. One half comprises the stern and cargo base, while the other half comprises the bow and cargo top. These halves are connected to and separated from each other by varying the amount of water within the hollow interior of the cargo base in order to control the vertical movement of the cargo base with respect to the cargo top.

I claim:

1. A ship formed of two freely interchangeable halves, one half of said ship comprising an elongated cargo base and a stern, said cargo base being substantially U-shaped in cross-section, with an upwardly facing open top, a vertically directed plate fixedly attached to the stern end of said cargo base, a second vertically directed plate fixedly attached to the forward end of said stern, said plates being attached to each other to connect said stern permanently to said cargo base, said plates extending transversely across a substantial portion of the hull of said ship adjacent to the stern end of said ship, said combined stern and cargo base forming one half of said ship, the other half of said ship comprising an elongated cargo top and a bow, said cargo top having a bottom contour formed complementarily to the upwardly facing open top of said cargo base, a third vertically directed plate fixedly attached to the forward end of said cargo top, a fourth vertically directed plate fixedly attached to the stern end of said bow, said third and fourth plates being attached to each other to connect said bow permanently to said cargo top, said plates extending transversely across a substantial portion of the hull of said ship adjacent to the forward end of said ship, said combined bow and cargo top forming the other half of said ship, said bow and stern being of variable configuration and all of said plates being of standard fixed configuration, so that a stern of any configuration can be attached to any cargo base and a bow of any configuration can be attached to any cargo top, the upper part of said cargo top being of variable configuration and at least the lower part of said cargo top and the upper part of said cargo base being of standard fixed configuration, so that any two ship halves can be used together by bringing said cargo top into engagement with said cargo base to form a complete ship, without regard to the configuration of the variable parts of both halves of said ship.

2. The structure described in claim 1, said cargo base having a hollow interior constructed and arranged to hold a variable quantity of water within the bottom and sides thereof, at least one pump and pump operating means disposed within said hollow interior for adding water to and subtracting water from said hollow interior, said ship halves adapted to be brought together and separated by operating said pump to control the amount of water in said cargo base and move said cargo base vertically into and out of engagement with said cargo top.

References Cited

UNITED STATES PATENTS

| | | | |
|---|---|---|---|
| 2,371,149 | 3/1945 | Bylo | 214—12 |
| 3,139,197 | 6/1964 | Bylo | 214—12 |

MILTON BUCHLER, *Primary Examiner.*

T. M. BLIX, *Assistant Examiner.*